United States Patent
Mauro et al.

(10) Patent No.: US 9,701,570 B2
(45) Date of Patent: Jul. 11, 2017

(54) HIGH CTE OPAL GLASS COMPOSITIONS AND GLASS ARTICLES COMPRISING THE SAME

(71) Applicant: Corning Incorporated, Corning, NY (US)

(72) Inventors: John Christopher Mauro, Corning, NY (US); Morten Mattrup Smedskjaer, Aalborg (DK); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/380,574

(22) PCT Filed: Feb. 27, 2013

(86) PCT No.: PCT/US2013/028096
§ 371 (c)(1),
(2) Date: Aug. 22, 2014

(87) PCT Pub. No.: WO2013/130668
PCT Pub. Date: Sep. 6, 2013

(65) Prior Publication Data
US 2015/0010739 A1 Jan. 8, 2015

Related U.S. Application Data

(60) Provisional application No. 61/604,862, filed on Feb. 29, 2012.

(51) Int. Cl.
| | | |
|---|---|---|
| C03C 3/118 | (2006.01) | |
| C03C 3/112 | (2006.01) | |
| B32B 7/02 | (2006.01) | |
| B32B 17/06 | (2006.01) | |
| C03C 4/02 | (2006.01) | |
| C03C 4/00 | (2006.01) | |
| C03B 17/02 | (2006.01) | |
| C03B 17/06 | (2006.01) | |

(52) U.S. Cl.
CPC .............. C03C 3/118 (2013.01); B32B 7/02 (2013.01); B32B 17/06 (2013.01); C03C 3/112 (2013.01); C03C 4/005 (2013.01); C03C 4/02 (2013.01); *B32B 2307/30* (2013.01); *B32B 2315/08* (2013.01); *B32B 2451/00* (2013.01); *C03B 17/02* (2013.01); *C03B 17/064* (2013.01); *C03C 2204/00* (2013.01); *Y10T 428/24942* (2015.01)

(58) Field of Classification Search
CPC C03C 3/118; C03C 3/112; C03C 4/02; C03C 4/005; C03C 21/00; C03C 21/002; B32B 7/02; B32B 17/06
See application file for complete search history.

(56) References Cited

U.S. PATENT DOCUMENTS

| | | | |
|---|---|---|---|
| 3,003,886 A | * | 10/1961 | Pither ..................... C03C 3/112 501/57 |
| 3,597,305 A | | 8/1971 | Giffen |
| 3,661,601 A | | 5/1972 | Dumbaugh et al. |
| 3,673,049 A | | 6/1972 | Giffen et al. |
| 3,737,294 A | | 6/1973 | Dumbaugh, Jr. et al. |
| 3,741,861 A | | 6/1973 | Andrieu |
| 3,746,526 A | | 7/1973 | Giffon |
| 3,849,097 A | | 11/1974 | Giffen et al. |
| 3,931,438 A | | 1/1976 | Beall et al. |
| 4,009,318 A | | 2/1977 | Elmer et al. |
| 4,102,664 A | | 7/1978 | Dumbaugh, Jr. |
| 4,130,680 A | | 12/1978 | Ference et al. |
| 4,214,886 A | | 7/1980 | Shay et al. |
| 4,298,390 A | * | 11/1981 | Flannery ................. C03C 3/083 501/151 |
| 4,309,219 A | | 1/1982 | Flannery et al. |
| 4,337,295 A | | 6/1982 | Rittler |
| 4,514,240 A | | 4/1985 | Heraud |

(Continued)

FOREIGN PATENT DOCUMENTS

| | | | |
|---|---|---|---|
| CN | 102690060 A | * | 9/2012 |
| EP | 0213733 | | 7/1986 |
| JP | 55004702 A | | 1/1980 |

OTHER PUBLICATIONS

International Search Report and Written Opinion, dated Jun. 13, 2013, pp. 1-8, International Patent Application No. PCT/US2013/028096, European Patent Office, The Netherlands.

Hijiya, et al., Effect of phase separation on crystallization of glasses in the BaO—TiO2—SiO2 system, 2009, pp. 120-126, Department of Material Science and Technology, Tokyo University of Science, Yamazaki, Nodashi, Chiba.

European Office Action, dated Apr. 26, 2016, pp. 1-6, European Application No. 13708624.5-1354, European Patent Office, Munich Germany.

Taiwanese Office Action, dated Apr. 25, 2016, pp. 1-4, Taiwanese Patent Application No. 102107038, Taiwan Intellectual Property Office, Patent Office, Taiwan.

(Continued)

*Primary Examiner* — Elizabeth A Bolden
(74) *Attorney, Agent, or Firm* — Michael A. Hood

(57) ABSTRACT

Opal glass compositions and glass articles comprising the same are disclosed. In one embodiment, a glass composition includes 55 mol. % to 70 mol. % $SiO_2$ and 9 mol. % to 15 mol. % $Al_2O_3$ as glass network formers. The glass composition also includes 10 mol. % to 15 mol. % alkali oxide $M_2O$, wherein M is at least one of Na and K. The glass composition also includes 2 mol. % to 8 mol. % divalent oxide RO, wherein R is at least one of Zn, Ca, and Mg. As an opalizing agent, the glass composition may also include 8.5 mol. % to 16 mol. % $F^-$. The glass composition may also include 0 mol. % to 0.3 mol. % $SnO_2$ as a fining agent and from about 0 mol. % to about 6 mol. % of colorant. The glass composition is free from As and compounds containing As.

20 Claims, 1 Drawing Sheet

(56) References Cited

U.S. PATENT DOCUMENTS

| | | | |
|---|---|---|---|
| 4,536,481 A * | 8/1985 | Flannery | ............... C03C 3/097 501/32 |
| 4,684,847 A | 8/1987 | Spierings et al. | |
| 5,019,538 A | 5/1991 | Borrelli et al. | |
| 5,342,426 A | 8/1994 | Dumbaugh, Jr. | |
| 5,559,060 A | 9/1996 | Dumbaugh, Jr. et al. | |
| 7,201,965 B2 | 4/2007 | Gulati et al. | |
| 7,514,149 B2 | 4/2009 | Bocko et al. | |
| 8,007,913 B2 | 8/2011 | Coppola et al. | |
| 2015/0030827 A1 | 1/2015 | Gomez et al. | |
| 2015/0037553 A1 | 2/2015 | Mauro | |

OTHER PUBLICATIONS

Chinese Office Action, dated Apr. 21, 2016, pp. 1-9, Chinese Patent Application No. 201380021086.X, The State Intellectual Property Office of the People's Republic of China.

Laminated Glass—Custom Cut Safety Glass, "Dulles Glass and Mirror", http://www.dullesglassandmirror.com/laminated-glass.asp.

Qingdao Kangdeli Industrial & Trading Co. Ltd, http://kangdeli.manufacturer.globalsources.com/si/6008825859096/Homepage.htm.

Englsh Translation of Japanese Office Actin JP2014560001 Dated Oct. 11, 2016, Japan Patent Office.

English Translation of KR1020147026636 Office Action Dated May 11, 2017, Korean Patent Office, 5 Pgs.

* cited by examiner

HIGH CTE OPAL GLASS COMPOSITIONS AND GLASS ARTICLES COMPRISING THE SAME

CROSS-REFERENCE TO RELATED APPLICATIONS

This application is a national stage entry under 35 U.S.C. §371 of International Application No. PCT/US2013/028096 filed on Feb. 27, 2013, which claims the benefit of priority under 35 U.S.C. §119 of U.S. Provisional Application Ser. No. 61/604,862, filed Feb. 29, 2012, the content of which is relied upon and incorporated herein by reference in its entirety.

BACKGROUND

Field

The present specification generally relates to glass compositions and, more specifically, to opal glass compositions which have a relatively high average CTE and glass articles comprising the same.

Technical Background

Glass articles formed from opal glass compositions are generally optically opaque. It is believed that the opaque characteristics of the glass are due, at least in part, to a phase separation which occurs within the glass as a result of an opacifying agent in the glass composition. Such opal glasses have been commonly used to enhance the appearance of a variety of consumer goods such as tableware and the like.

Further, glass articles, such as glass sheets and the like, may be incorporated into consumer goods, such as mobile electronic devices, appliances, and the like. These glass articles must be sufficiently robust to endure regular contact without damage. For example, glass articles may be incorporated in portable electronic devices, such as mobile telephones, personal media players, and tablet computers or used as tableware. The glass articles may be susceptible to damage during transport and/or use of the associated device. Accordingly, glass articles used in consumer goods require enhanced strength to be able to withstand incidental contact and impacts which may occur when the goods are used and/or transported.

The unique appearance of opal glasses make opal glasses an attractive option to enhance the appearance of consumer goods which incorporate glass articles. However, opal glass used in such goods must be sufficiently robust to withstand the rigors of day to day use. Accordingly, a need exists for alternative opal glass compositions which may be used to form mechanically robust glass articles and glass articles incorporating the same.

SUMMARY

According to one embodiment, a glass composition may include from about 55 mol. % to about 70 mol. % $SiO_2$ and from about 9 mol. % to about 15 mol. % $Al_2O_3$ as glass network formers. The glass composition may also include from about 10 mol. % to about 15 mol. % alkali oxide $M_2O$, wherein M is at least one of Na and K. The glass composition may also include from about 2 mol. % to about 8 mol. % divalent oxide RO, wherein R is at least one of Zn, Ca, and Mg. As an opalizing agent, the glass composition may also include from about 8.5 mol. % to about 16 mol. % $F^-$. The glass composition may also include from about 0 mol. % to about 0.3 mol. % $SnO_2$ as a fining agent and from about 0 mol. % to about 6 mol. % of colorant. The glass composition is free from As and compounds containing As.

In one set of embodiments, a glass article includes a glass core layer disposed between a first glass cladding layer and a second glass cladding layer. In some of these embodiments, the core glass may have a first surface and a second surface opposite the first surface, where the first glass cladding layer may be fused to the first surface of the glass core layer and a second glass cladding layer may be fused to the second surface of the glass core layer. In other embodiments, a first diffusive glass layer may be disposed between the glass core layer and the first glass cladding layer; additionally a second diffusive glass layer may be disposed between the glass core layer and the second glass cladding layer; these diffusive layers may be formed during, for example, the fusion forming process. The glass core layer is formed from an opal glass composition which may include from about 55 mol. % to about 70 mol. % $SiO_2$ and from about 9 mol. % to about 15 mol. % $Al_2O_3$ as glass network formers. The glass composition may also include from about 10 mol. % to about 15 mol. % $M_2O$, wherein M is at least one of Na and K. The glass network may also include from about 2 mol. % to about 8 mol. % divalent oxide RO, wherein R is at least one of Zn, Ca, and Mg. As an opalizing agent, the glass composition may include from about 8.5 mol. % to about 16 mol. % $F^-$. The glass composition may also include from about 0 mol. % to about 0.3 mol. % $SnO_2$. The glass composition may be free from As and compounds containing As.

Additional features and advantages of the glass compositions and glass articles formed from the glass composition will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
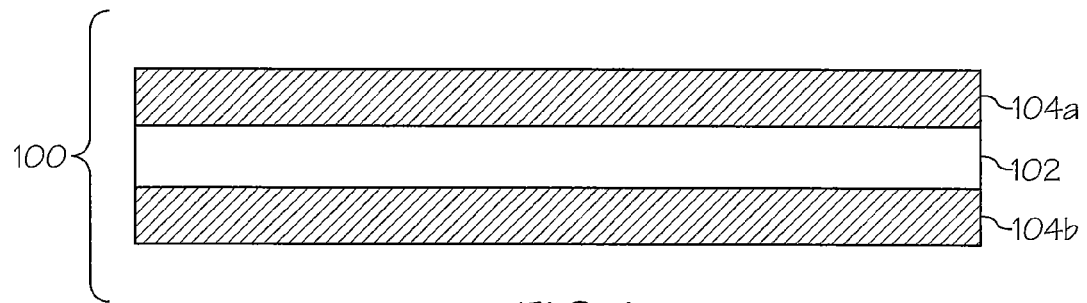
FIG. 1 schematically depicts a cross section of a laminated glass article according to one or more embodiments shown and described herein.

Reference will now be made in detail to embodiments of glass compositions having high average coefficients of thermal expansion and glass articles incorporating the same, examples of which are illustrated in the accompanying drawings. Whenever possible, the same reference numerals will be used throughout the drawings to refer to the same or like parts. The glass compositions described herein generally have relatively high average coefficients of thermal expansion and, as such, may be utilized in conjunction with cladding glass compositions having relatively low average coefficients of thermal expansion to produce laminated glass articles which are compressively stressed without being ion-exchanged or thermally tempered. In one embodiment, a glass composition may include from about 55 mol. % to about 70 mol. % $SiO_2$ and from about 9 mol. % to about 15 mol. % $Al_2O_3$ as glass network formers. The glass composition may also include from about 10 mol. % to about 15 mol. % alkali oxide $M_2O$, wherein M is at least one of Na and K. The glass composition may also include from about 2 mol. % to about 8 mol. % divalent oxide RO, wherein R is at least one of Zn, Ca, and Mg. As an opalizing agent, the glass composition may also include from about 8.5 mol. % to about 16 mol. % $F^-$. The glass composition may also include from about 0 mol. % to about 0.3 mol. % $SnO_2$ as a fining agent and from about 0 mol. % to about 6 mol. % of colorant. The glass composition is free from As and compounds containing As. Various embodiments of the glass composition and glass articles formed from the glass compositions will be described in more detail herein with specific reference to the appended drawings.

The term "liquidus viscosity," as used herein, refers to the shear viscosity of the glass composition at its liquidus temperature.

The term "liquidus temperature," as used herein, refers to the highest temperature at which devitrification occurs in the glass composition.

The term "CTE," as used herein, refers to the coefficient of thermal expansion of the glass composition averaged over a temperature range from about 20° C. to about 300° C.

The term "substantially free," when used to described the absence of a particular oxide component in a glass composition, means that the component is present in the glass composition as a contaminant in a trace amount of less than 1 mol. %.

In the embodiments of the glass compositions described herein, the concentration of constituent components (e.g., $SiO_2$, $Al_2O_3$, and the like) are given in mole percent (mol. %) on an oxide basis, unless otherwise specified.

In the embodiments of the glass compositions described herein, $SiO_2$ is the largest constituent of the composition and, as such, $SiO_2$ is the primary constituent of the glass network. When the concentration of $SiO_2$ in the glass composition is low (i.e., less than about 55 mol. %) the chemical durability of the resultant glass is low. In addition, the liquidus viscosity of the resultant glass may also be low rendering the glass unsuitable for fusion formation, such as with a fusion down draw process and/or a fusion lamination process. However, if the concentration of $SiO_2$ in the glass composition is too high (i.e., greater than about 70 mol. %), the formability of the glass composition may be diminished as higher concentrations of $SiO_2$ increase the difficulty of melting the glass which, in turn, adversely impacts the formability of the glass. In the embodiments described herein, the glass composition generally comprises $SiO_2$ in a concentration greater than or equal to about 55 mol. % and less than or equal to about 70 mol. % in order to facilitate fusion forming the glass compositions. In some embodiments, the concentration of $SiO_2$ in the glass composition is greater than or equal to about 58 mol. % and less than or equal to about 64 mol. %. In still other embodiments, the concentration of $SiO_2$ in the glass composition is greater than or equal to about 60 mol. % and less than or equal to about 64 mol. %. In some other embodiments, the glass composition comprises $SiO_2$ in a concentration greater than or equal to about 62 mol. % and less than or equal to about 64 mol. %.

The glass compositions described herein also comprise $Al_2O_3$. $Al_2O_3$ serves as a glass network former, similar to $SiO_2$. Like $SiO_2$, $Al_2O_3$ increases the viscosity of the glass composition due to its tetrahedral coordination in a glass melt formed from the glass composition. $Al_2O_3$ also increases the chemical durability of the glass and improves the degree by which the glass can be strengthened. Specifically, $Al_2O_3$ also increases the strain point of the glass thereby increasing the temperature at which compressive stresses develop in the glass as the glass cools and, as such, increases amount of stress which can develop in the glass.

In the embodiments of the glass compositions described herein, the concentration of $Al_2O_3$ is generally less than or equal to about 15 mol. %. For example, in some embodiments, the concentration of $Al_2O_3$ in the glass compositions is greater than or equal to about 9 mol. % and less than or equal to about 15 mol. %. In some embodiments, the concentration of $Al_2O_3$ in the glass compositions may be greater than or equal to about 9 mol. % and less than or equal to about 13 mol. %. In some embodiments, the concentration of $Al_2O_3$ in the glass compositions may be greater than or equal to about 10 mol. % and less than or equal to about 12 mol. %.

The glass compositions also include alkali oxides $M_2O$, where M is at least one of Na and K. Accordingly, it should be understood that the glass compositions described herein may include $K_2O$, $Na_2O$ or combinations of $Na_2O$ and $K_2O$. In some embodiments, the alkali oxide $M_2O$ present in the glass composition consists only of $Na_2O$. The addition of alkali oxides to the glass compositions increases the average coefficient of thermal expansion of the resultant glass. The alkali oxides also decrease the liquidus temperature of the glass thereby improving the formability of the glass. However, in embodiments where the glass composition is utilized to form a glass core layer of a laminated glass article, the presence of alkali oxides in the composition may facilitate ion-exchange strengthening the interface between the glass core layer and the glass cladding layers fused to the glass core layer.

In the embodiments described herein, the total concentration of alkali oxide $M_2O$ in the glass compositions is generally less than about 15 mol. %. For example, in some embodiments, the concentration of $M_2O$ in the glass compositions is greater than or equal to about 10 mol. % and less than or equal to about 15 mol. %. In some other embodiments, the total concentration of $M_2O$ is greater than or equal to about 10 mol. % and less than or equal to about 12 mol. %. In still other embodiments, the concentration of $M_2O$ is greater than or equal to about 11 mol. % and less than or equal to about 13 mol. %.

As noted hereinabove, the alkali oxide $M_2O$ may comprise $Na_2O$, $K_2O$ or combinations thereof. $Na_2O$ may be present in the glass compositions in a concentration greater than or equal to about 5 mol. % and less than or equal to about 15 mol. %. In some embodiments, the concentration of $Na_2O$ may be greater than or equal to about 7 mol. % and less than or equal to about 13 mol. %. In some other embodiments, the concentration of $Na_2O$ may be greater than or equal to about 9 mol. % and less than or equal to about 13 mol. %. When $K_2O$ is present in the glass compositions, the $K_2O$ may be present in a concentration greater than or equal to about 2 mol. % and less than or equal to about 7 mol. %. In some embodiments, $K_2O$ may be present in the glass composition in a concentration from about 3 mol. % to about 5 mol. %. Additions of $K_2O$ as a substitute for $Na_2O$ increase the CTE of the glass composition while decreasing the liquidus temperature.

The glass compositions described herein may further include divalent oxide RO, where R is at least one of Zn, Ca and Mg. Accordingly, it should be understood that the glass composition may include ZnO, CaO, MgO or combinations thereof. In some embodiments, the divalent oxide RO present in the glass composition consists only of one of ZnO, CaO or MgO. For example, in some embodiments, the divalent oxide RO consists only of ZnO. The divalent oxides improve the melting behavior of the glass composition by increasing the liquidus viscosity of the glass compositions which, in turn, improves the formability of the glass compositions. The divalent oxides also increase the average coefficient of thermal expansion of the glass compositions, albeit to a lesser extent than the alkali oxides. In particular, the divalent oxides CaO and MgO (i.e., the alkaline earth oxides) increase the average coefficient of thermal expansion of the glass composition and also increase the liquidus viscosity.

In the embodiments described herein, the total concentration of divalent oxide RO (i.e., the total concentration of MgO, CaO and/or ZnO) is greater than or equal to about 2 mol. % and less than or equal to about 8 mol. %. In some of these embodiments, the total concentration of divalent oxide RO is less than or equal to about 5.5 mol. %, such as when the total concentration of divalent oxide is greater than or equal to about 2 mol. % and less than or equal to about 5.5 mol. %.

As noted hereinabove, the divalent oxide RO may comprise MgO, CaO, ZnO or combinations thereof. MgO may be present in the glass compositions in a concentration greater than or equal to about 0 mol. % and less than or equal to about 4.0 mol. %. In some embodiments, the concentration of MgO may be greater than or equal to about 0 mol. % and less than or equal to about 3.5 mol. %. CaO may be present in the glass compositions a concentration greater than or equal to about 0 mol. % and less than or equal to about 4 mol. %. In some embodiments, CaO may be present in the glass composition in a concentration from about 0 mol. % to about 3.5 mol. %. ZnO may be present in the glass compositions in a concentration greater than or equal to about 2 mol. % and less than or equal to about 8 mol. %. In some embodiments, ZnO may be present in the glass composition in a concentration greater than or equal to about 3 mol. % and less than or equal to about 8 mol. %. In some other embodiments, ZnO may be present in the glass composition in a concentration greater than or equal to 5.5 mol. % and less than or equal to about 8 mol. %.

The glass compositions described herein also include fluorine ions ($F^-$). $F^-$ acts as an opalizing agent which changes the glass from transparent or translucent to opaque. While not wishing to be bound by theory, it is believed that this transformation of the glass from transparent or translucent to opaque is due to a phase separation in the glass substrate due to the presence of fluorine. In the embodiments described herein, this transformation occurs either as the glass composition is shaped into a glass article (i.e., "on the draw") or, alternatively, by applying a heat treatment to the glass article following shaping. The glasses are thereafter referred to as opal glasses. In the embodiments described herein the fluorine may be introduced into the glass by fluorine precursors added to the glass batch, including, without limitation, $CaF_2$, $Na_2SiF_6$, $AlF_3$, or $Na_3AlF_6$.

In the embodiments described herein, the glass compositions, as batched, include $F^-$ in a concentration greater than or equal to about 8.5 mol. % and less than or equal to about 16 mol. %. In some embodiments, the concentration of $F^-$ may be greater than or equal to about 12.5 mol. % and less than or equal to about 16 mol. %. In some embodiments, the concentration of $F^-$ in the glass compositions may be greater than or equal to about 10.5 mol. % and less than or equal to about 16 mol. % or even less than or equal to about 14 mol. %.

In some embodiments, the glass composition may further comprise a colorant. The colorant is added to the glass composition to impart color to the opal glass after the transformation from translucent or transparent to opaque has occurred. For example, in embodiments where the transformation to opaque produces a glass which is milky white in color, the addition of a colorant to the glass composition changes the color of the opaque glass to the color of the colorant. Suitable colorants include, without limitation, $Fe_2O_3$, $Cr_2O_3$, $Co_3O_4$, CuO, Au, and $V_2O_5$, each of which may impart a unique color to the opalized glass.

In the embodiments described herein, the colorant may be present in the glass composition in a concentration greater than or equal to about 0 mol. % (i.e., no colorant) to a concentration greater than or equal to about 6 mol. %. In some embodiments, the colorant may have a concentration greater than or equal to about 0 mol. % to less than or equal to about 5 mol. %. In some other embodiments, the concentration of the colorant in the glass composition may be greater than or equal to about 0 mol. % and less than or equal to 2 mol. % or even less than or equal to about 1 mol %.

In embodiments where the colorant is $Fe_2O_3$, the $Fe_2O_3$ may be present in the glass composition in a concentration greater than or equal to about 0 mol. % and less than or equal to about 3 mol. %. In embodiments where the colorant is $Cr_2O_3$, the $Cr_2O_3$ may be present in the glass composition in a concentration greater than or equal to about 0 mol. % and less than or equal to about 2 mol. %. In embodiments where the colorant is $Co_3O_4$, the $Co_3O_4$ may be present in the glass composition in a concentration greater than or equal to about 0 mol. % and less than or equal to about 1 mol. %. In embodiments where the colorant is CuO, the CuO may be present in the glass composition in a concentration greater than or equal to about 0 mol. % and less than or equal to about 3 mol. %. In embodiments where the colorant is Au, the Au may be present in the glass composition in a concentration greater than or equal to about 0 mol. % and less than or equal to about 1 mol. %. In embodiments where the colorant is $V_2O_5$, the $V_2O_5$ may be present in the glass composition in a concentration greater than or equal to about 0 mol. % and less than or equal to about 4 mol. %.

In some embodiments of the glass compositions described herein, the glass compositions may further comprise $B_2O_3$. Like $SiO_2$ and $Al_2O_3$, $B_2O_3$ contributes to the formation of the glass network. $B_2O_3$ is added to the glass compositions to decrease the viscosity and liquidus temperature of the glass compositions. Specifically, an increase in the concentration of $B_2O_3$ by 1 mol. % may decrease the temperature required to obtain an equivalent viscosity by 10° C. to 14° C., depending on the specific composition of the glass. However, $B_2O_3$ can lower the liquidus temperature of glass compositions by 18° C. to 22° C. per mol. % of $B_2O_3$. As such, $B_2O_3$ decreases the liquidus temperature of the glass composition more rapidly than it decreases the liquidus viscosity of the glass compositions, effectively increasing the liquidus viscosity. $B_2O_3$ can also be added to the glass composition to soften the glass network. Accordingly, $B_2O_3$ is useful for improving the melting performance of the glass composition. Additions of $B_2O_3$ to the glass composition also reduce the Young's modulus of the glass composition and improve the intrinsic damage resistance of the glass.

In the embodiments described, $B_2O_3$ may be present in the glass composition in a concentration greater than or equal to about 0 mol. % and less than or equal to about 5 mol. %. For example, in some embodiments, the glass composition may include greater than or equal to about 0 mol. % $B_2O_3$ and less than or equal to about 3 mol. % $B_2O_3$.

The glass compositions described herein may optionally include a fining agent. The fining agent may be, for example, $SnO_2$. The fining agent may be present in the glass compositions in a concentration greater than or equal to about 0 mol. % and less than or equal to about 0.5 mol. %. In some embodiments, the fining agent may be present in the glass composition in a concentration greater than or equal to about 0 mol. % and less than or equal to about 0.2 mol. % or even less than or equal to about 0.15 mol. %. While the embodiments of the glass compositions described herein may include a fining agent, the glass compositions are substantially free from arsenic and/or antimony and compounds comprising the same. As such, it should be understood that the glass compositions described herein are substantially free from fining agents such as $As_2O_3$ and $Sb_2O_3$.

The glass compositions described herein generally have an average coefficient of thermal expansion (CTE) which is greater than or equal to about $75 \times 10^{-7}/°$ C. in a range from 20° C. to 300° C. In some embodiments, the average CTE of the glass compositions may be greater than or equal to about $80 \times 10^{-7}/°$ C. in a range from 20° C. to 300° C. In yet other embodiments, the average CTE of the glass compositions may be greater than or equal to about $85 \times 10^{-7}/°$ C. averaged over a range from 20° C. to 300° C. The relatively high average CTE values of the glass compositions are attributable, at least in part, to the concentration of alkali oxides in the glass. These relatively high average CTEs make the glass compositions particularly well suited for use as glass core layers of a fusion-formed laminated glass article. Specifically, when low average CTE glass cladding layers are paired with glass core layers having a higher average CTE during a fusion lamination process, the difference in the average CTEs of the glass core layer and the glass cladding layers results in the formation of a compressive stress in the glass cladding layers upon cooling. Accordingly, the glass compositions described herein may be utilized to form a strengthened laminated glass article.

Further, the glass compositions described herein have liquidus viscosities and liquidus temperatures suitable for fusion formation, such as by the fusion down-draw process and/or the fusion lamination process. In particular, the glass compositions described herein have a liquidus viscosity that is greater than or equal to about 35 kPoise. In some embodiments, the liquidus viscosity is greater than or equal to 100 kPoise or even greater than or equal to 200 kPoise. The liquidus temperature of the glass compositions is less than or equal to about 1400° C. In some embodiments, the liquidus temperature is less than or equal to 1350° C. or even less than or equal to 1300° C.

Based on the foregoing, it should be understood that various embodiments of high average CTE opal glass compositions are disclosed herein. In a first exemplary embodiment, a glass composition may include from about 55 mol. % to about 70 mol. % $SiO_2$ and from about 9 mol. % to about 15 mol. % $Al_2O_3$ as glass network formers. The glass composition may also include from about 10 mol. % to about 15 mol. % alkali oxide $M_2O$, wherein M is at least one of Na and K. The glass composition may also include from about 2 mol. % to about 8 mol. % divalent oxide RO, wherein R is at least one of Zn, Ca, and Mg. As an opalizing agent, the glass composition may also include from about 8.5 mol. % to about 16 mol. % $F^-$. The glass composition may also include from about 0 mol. % to about 0.3 mol. % $SnO_2$ as a fining agent and from about 0 mol. % to about 6 mol. % of colorant. The glass composition is free from As and compounds containing As. The glass composition may have an average CTE greater than or equal to $75 \times 10^{-7}/°$ C. or even $85 \times 10^{-7}/°$ C.

In a second exemplary embodiment, a glass composition may include from about 58 mol. % to about 64 mol. % $SiO_2$ and from about 10 mol. % to about 12 mol. % $Al_2O_3$ as glass network formers. The glass composition may also include from about 11 mol. % to about 13 mol. % alkali oxide $M_2O$, wherein M is at least one of Na and K. The glass composition may also include from about 2 mol. % to about 5.5 mol. % divalent oxide RO, wherein R is at least one of Zn, Ca, and Mg. As an opalizing agent, the glass composition may also include from about 12.5 mol. % to about 16 mol. % $F^-$. The glass composition may also include from about 0 mol. % to about 0.3 mol. % $SnO_2$ as a fining agent and from about 0 mol. % to about 6 mol. % of colorant. The glass composition is free from As and compounds containing As. The glass composition may have an average CTE greater than or equal to $75 \times 10^{-7}/°$ C. or even $85 \times 10^{-7}/°$ C.

In a third exemplary embodiment, a glass composition may include from about 55 mol. % to about 70 mol. % $SiO_2$ and from about 9 mol. % to about 15 mol. % $Al_2O_3$ as glass network formers. The glass composition may also include from about 10 mol. % to about 15 mol. % alkali oxide $M_2O$, wherein M is at least one of Na and K. The glass composition may also include from about 2 mol. % to about 8 mol. % divalent oxide RO, wherein R is at least one of Zn, Ca, and Mg. As an opalizing agent, the glass composition may also include from about 8.5 mol. % to about 16 mol. % $F^-$. The glass composition may also include from about 0 mol. % to about 0.3 mol. % $SnO_2$ as a fining agent and from about 0 mol. % to about 2 mol. % of colorant. The glass composition is free from As and compounds containing As. The glass composition may have an average CTE greater than or equal to $75 \times 10^{-7}/°$ C. or even $85 \times 10^{-7}/°$ C.

In a fourth exemplary embodiment, a glass composition may include from about 55 mol. % to about 70 mol. % $SiO_2$ and from about 9 mol. % to about 15 mol. % $Al_2O_3$ as glass network formers. The glass composition may also include from about 10 mol. % to about 15 mol. % alkali oxide $M_2O$, wherein M is at least one of Na and K. The glass composition may also include from about 2 mol. % to about 8 mol. % divalent oxide RO, wherein R is at least one of Zn, Ca, and Mg. As an opalizing agent, the glass composition may also include from about 8.5 mol. % to about 16 mol. % $F^-$. The glass composition may also include from about 0 mol. % to about 0.3 mol. % $SnO_2$ as a fining agent and from about 0 mol. % to about 6 mol. % of colorant. The colorant may be selected from the group consisting of $Fe_2O_3$, $Cr_2O_3$, $Co_3O_4$, CuO, Au, and $V_2O_5$. The glass composition is free from As and compounds containing As. The glass composition may have an average CTE greater than or equal to $75 \times 10^{-7}/°$ C. or even $85 \times 10^{-7}/°$ C.

In a fifth exemplary embodiment, a glass composition may include from about 55 mol. % to about 70 mol. % $SiO_2$ and from about 9 mol. % to about 15 mol. % $Al_2O_3$ as glass network formers. The glass composition may also include from about 10 mol. % to about 15 mol. % alkali oxide $M_2O$, wherein M is Na. The glass composition may also include from about 2 mol. % to about 8 mol. % divalent oxide RO, wherein R is at least one of Zn, Ca, and Mg. As an opalizing agent, the glass composition may also include from about 8.5 mol. % to about 16 mol. % F$^-$. The glass composition may also include from about 0 mol. % to about 0.3 mol. % SnO$_2$ as a fining agent and from about 0 mol. % to about 6 mol. % of colorant. The glass composition is free from As and compounds containing As. The glass composition may have an average CTE greater than or equal to 75×10$^{-7}$/° C. or even 85×10$^{-7}$/° C.

In a sixth exemplary embodiment, a glass composition may include from about 55 mol. % to about 70 mol. % SiO$_2$ and from about 9 mol. % to about 15 mol. % Al$_2$O$_3$ as glass network formers. The glass composition may also include from about 10 mol. % to about 15 mol. % alkali oxide M$_2$O, wherein M is at least one of Na and K. The glass composition may also include from about 2 mol. % to about 8 mol. % divalent oxide RO, wherein R is at least one of Zn, Ca, and Mg. As an opalizing agent, the glass composition may also include from about 8.5 mol. % to about 16 mol. % F$^-$. The glass composition may also include from about 0 mol. % to about 0.3 mol. % SnO$_2$ as a fining agent and from about 0 mol. % to about 6 mol. % of colorant. The glass composition may also include B$_2$O$_3$. The glass composition is free from As and compounds containing As. The glass composition may have an average CTE greater than or equal to 75×10$^{-7}$/° C. or even 85×10$^{-7}$/° C.

In an eighth exemplary embodiment, a glass composition may include from about 55 mol. % to about 70 mol. % SiO$_2$ and from about 9 mol. % to about 15 mol. % Al$_2$O$_3$ as glass network formers. The glass composition may also include from about 10 mol. % to about 15 mol. % alkali oxide M$_2$O, wherein M is at least one of Na and K. The glass composition may also include from about 2 mol. % to about 8 mol. % divalent oxide RO, wherein R is at least one of Zn, Ca, and Mg. As an opalizing agent, the glass composition may also include from about 10.5 mol. % to about 16 mol. % F$^-$. The glass composition may also include from about 0 mol. % to about 0.3 mol. % SnO$_2$ as a fining agent and from about 0 mol. % to about 6 mol. % of colorant. The glass composition is free from As and compounds containing As. The glass composition may have an average CTE greater than or equal to 75×10$^{-7}$/° C. or even 85×10$^{-7}$/° C.

In a ninth exemplary embodiment, a glass composition may include from about 55 mol. % to about 70 mol. % SiO$_2$ and from about 9 mol. % to about 15 mol. % Al$_2$O$_3$ as glass network formers. The glass composition may also include from about 10 mol. % to about 15 mol. % alkali oxide M$_2$O, wherein M is at least one of Na and K. The glass composition may also include from about 2 mol. % to about 8 mol. % divalent oxide RO, wherein R is at least one of Zn, Ca, and Mg. As an opalizing agent, the glass composition may also include from about 12.5 mol. % to about 16 mol. % F$^-$. The glass composition may also include from about 0 mol. % to about 0.3 mol. % SnO$_2$ as a fining agent and from about 0 mol. % to about 6 mol. % of colorant. The glass composition is free from As and compounds containing As. The glass composition may have an average CTE greater than or equal to 75×10$^{-7}$/° C. or even 85×10$^{-7}$/° C.

In a tenth exemplary embodiment, a glass composition may include from about 55 mol. % to about 70 mol. % SiO$_2$ and from about 9 mol. % to about 15 mol. % Al$_2$O$_3$ as glass network formers. The glass composition may also include from about 10 mol. % to about 15 mol. % alkali oxide M$_2$O, wherein M is at least one of Na and K. The glass composition may also include from about 2 mol. % to about 8 mol. % divalent oxide RO, wherein R is Zn. As an opalizing agent, the glass composition may also include from about 8.5 mol. % to about 16 mol. % F$^-$. The glass composition may also include from about 0 mol. % to about 0.3 mol. % SnO$_2$ as a fining agent and from about 0 mol. % to about 6 mol. % of colorant. The glass composition is free from As and compounds containing As. The glass composition may have an average CTE greater than or equal to 75×10$^{-7}$/° C. or even 85×10$^{-7}$/° C.

In an eleventh exemplary embodiment, a glass composition may include from about 55 mol. % to about 70 mol. % SiO$_2$ and from about 9 mol. % to about 15 mol. % Al$_2$O$_3$ as glass network formers. The glass composition may also include from about 10 mol. % to about 15 mol. % alkali oxide M$_2$O, wherein M is at least one of Na and K. The glass composition may also include from about 2 mol. % to about 5.5 mol. % divalent oxide RO, wherein R is Zn. As an opalizing agent, the glass composition may also include from about 8.5 mol. % to about 16 mol. % F$^-$. The glass composition may also include from about 0 mol. % to about 0.3 mol. % SnO$_2$ as a fining agent and from about 0 mol. % to about 6 mol. % of colorant. The glass composition is free from As and compounds containing As. The glass composition may have an average CTE greater than or equal to 75×10$^{-7}$/° C. or even 85×10$^{-7}$/° C.

While exemplary glass compositions have been described hereinabove with reference to specific compositional ranges for various constituent components (such as SiO$_2$, Al$_2$O$_3$, and the like) of each glass composition, it should be understood that each compositional range of each constituent component may include one or more narrower compositional ranges for that constituent component, as described above. Further, it should also be understood that these narrower ranges of the constituent components and/or the relationships between various constituent components may be incorporated in any of the embodiments of the glass compositions described herein in order to produce a glass having the desired properties.

Referring now to FIG. 1, the glass compositions described herein may be used to form a glass article, such as the laminated glass article 100 schematically depicted in cross section in FIG. 1. The laminated glass article 100 generally comprises a glass core layer 102 and a pair of glass cladding layers 104a, 104b. The glass compositions described herein are particularly well suited for use as the glass core layer due to their relatively high average coefficients of thermal expansion, as will be discussed in more detail herein.

FIG. 1 illustrates the glass core layer 102 shown comprising a first surface 103a and a second surface 103b which is opposed to the first surface 103a. A first glass cladding layer 104a is fused to the first surface 103a of the glass core layer 102 and a second glass cladding layer 104b is fused to the second surface 103b of the glass core layer 102. The glass cladding layers 104a, 104b are fused to the glass core layer 102 without any additional materials, such as adhesives, coating layers or the like, disposed between the glass core layer 102 and the glass cladding layers 104a, 104b. Thus, a first surface of the glass core layer is directly adjacent the first glass cladding layer, and a second surface of the glass core layer is directly adjacent the second glass cladding layer. In some embodiments, the glass core layer 102 and the glass cladding layers 104a, 104b are formed via a fusion lamination process. Diffusive layers (not shown) may form between the glass core layer 102 and the glass cladding layer 104a, or between the glass core layer 102 and the glass cladding layer 104b, or both. In such case, the average cladding coefficient of thermal expansion of the first diffusive layer has a value between that of an average cladding coefficient of thermal expansion of the core and an average cladding coefficient of thermal expansion of the first clad layer, or the average cladding coefficient of thermal expansion of the second diffusive layer has a value between that of an average cladding coefficient of thermal expansion of the core and an average cladding coefficient of thermal expansion of the second clad layer.

In the embodiments of the laminated glass article 100 described herein, the glass core layer 102 is formed from a first glass composition having an average core coefficient of thermal expansion $CTE_{core}$ and the glass cladding layers 104a, 104b are formed from a second, different glass composition which has as an average coefficient of thermal expansion $CTE_{clad}$. The $CTE_{core}$ is greater than $CTE_{clad}$ which results in the glass cladding layers 104a, 104b being compressively stressed without being ion exchanged or thermally tempered.

Figure 2:
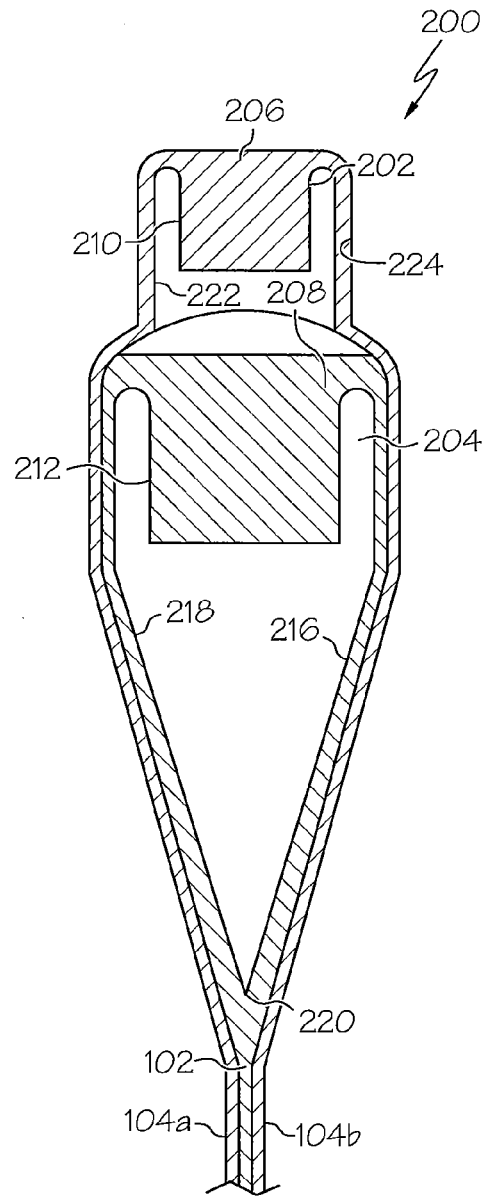
FIG. 2 schematically depicts a fusion draw process for making the glass article of FIG. 1.

Specifically, the glass articles 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a laminated glass article includes an upper isopipe 202 which is positioned over a lower isopipe 204. The upper isopipe 202 includes a trough 210 into which a molten glass cladding composition 206 is fed from a melter (not shown). Similarly, the lower isopipe 204 includes a trough 212 into which a molten glass core composition 208 is fed from a melter (not shown). In the embodiments, described herein, the molten glass core composition 208 has an average coefficient of thermal expansion $CTE_{core}$ which is greater than the average coefficient of thermal expansion $CTE_{clad}$ of the molten glass cladding composition 206.

As the molten glass core composition 208 fills the trough 212, it overflows the trough 212 and flows over the outer forming surfaces 216, 218 of the lower isopipe 204. The outer forming surfaces 216, 218 of the lower isopipe 204 converge at a root 220. Accordingly, the molten glass core composition 208 flowing over the outer forming surfaces 216, 218 rejoins at the root 220 of the lower isopipe 204 thereby forming a glass core layer 102 of a laminated glass article.

Simultaneously, the molten glass cladding compositions 206 overflows the trough 210 formed in the upper isopipe 202 and flows over outer forming surfaces 222, 224 of the upper isopipe 202. The molten glass cladding composition 206 is outwardly deflected by the upper isopipe 202 such that the molten glass cladding composition 206 flows around the lower isopipe 204 and contacts the molten glass core composition 208 flowing over the outer forming surfaces 216, 218 of the lower isopipe, fusing to the molten glass core composition and forming glass cladding layers 104a, 104b around the glass core layer 102.

As noted hereinabove, the molten glass core composition 208 generally has an average coefficient of thermal expansion $CTE_{core}$ which is greater than the average coefficient of thermal expansion $CTE_{clad}$ of the molten glass cladding composition 206. Accordingly, as the glass core layer 102 and the glass cladding layers 104a, 104b cool, the difference in the average coefficients of thermal expansion of the glass core layer 102 and the glass cladding layers 104a, 104b cause a compressive stresses to develop in the glass cladding layers 104a, 104b. The compressive stress increases the strength of the resulting laminated glass article without an ion-exchange treatment or thermal tempering treatment.

Referring again to the laminated glass article 100 depicted in FIG. 1, the glass core layer 102 of the laminated glass article is formed from a glass composition with a relatively high average coefficient of thermal expansion, such as the glass compositions described herein which have average coefficients of thermal expansion greater than or equal to $75\times10^{-7}/°$ C.

For example, in one embodiment, the glass core layer is formed from a glass composition having a high average CTE, such as the glass compositions described hereinabove which comprise from about 55 mol. % to about 70 mol. % $SiO_2$; from about 9 mol. % to about 15 mol. % $Al_2O_3$; from about 10 mol. % to about 15 mol. % alkali oxide $M_2O$, wherein M is at least one of Na and K; from about 2 mol. % to about 8 mol. % divalent oxide RO, wherein R is at least one of Zn, Ca, and Mg; from about 8.5 mol. % to about 16 mol. % $F^-$; from about 0 mol. % to about 0.3 mol. % $SnO_2$; and from about 0 mol. % to about 6 mol. % of colorant, wherein the glass composition is free from As and compounds containing As.

In another embodiment, the glass core layer may be formed from a glass composition with a high average CTE which includes from about 58 mol. % to about 64 mol. % $SiO_2$; from about 10 mol. % to about 12 mol. % $Al_2O_3$; from about 11 mol. % to about 13 mol. % $M_2O$; from about 2 mol. % to about 5.5 mol. % RO; from about 12.5 mol. % to about 16 mol. % $F^-$; from about 0 mol. % to about 0.3 mol. % $SnO_2$; and from about 0 mol. % to about 6 mol. % of colorant, wherein the glass composition is free from As and compounds containing As.

While specific glass compositions for use as the glass core layer 102 have been described herein, it should be understood that any of the glass compositions described herein may be used to form the glass core layer 102 of the laminated glass article 100.

Further, while the glass core layer 102 of the glass laminate structure has been described hereinabove as being formed from a glass composition having a relatively high average coefficient of thermal expansion, the glass cladding layers 104a, 104b of the glass article 100 are formed from glass compositions which have a lower average coefficient of thermal expansion to facilitate the development of compressive stress in the cladding layers upon cooling of the laminated glass article following fusion formation. For example, the glass cladding layers may be formed from a glass composition such as a composition described in co-pending U.S. Patent Application No. 61/604,839 entitled "Low CTE Alkali-Free BoroAluminosilcate Glass Compositions and Glass Articles Comprising the Same" assigned to Corning Incorporated, which have average coefficients of thermal expansion less than or equal to $40\times10^{-7}/°$ C. averaged over a temperature range from 20° C. to 300° C. For example, the glass cladding layers may be formed from a glass composition which comprises: from about 60 mol. % to about 66 mol. % $SiO_2$; from about 7 mol. % to about 10 mol. % $Al_2O_3$; from about 14 mol. % to about 18 mol. % $B_2O_3$; and from about 9 mol. % to about 16 mol. % alkaline earth oxide, wherein the alkaline earth oxide comprises at least CaO and the CaO is present in the glass composition in a concentration from about 3 mol. % to about 12 mol % and the glass composition is substantially free from alkali metals and compounds containing alkali metals.

In another embodiment, the glass cladding layers may be formed from a glass composition described in co-pending U.S. Patent Application No. 61/604,833 entitled "Low CTE, Ion-Exchangeable Glass Compositions and Glass Articles Comprising the Same" assigned to Corning Incorporated, which have average coefficients of thermal expansion less than or equal to $55\times10^{-7}/°$ C. averaged over a temperature range from 20° C. to 300° C. For example, the glass cladding layers may be formed from a glass composition which comprises: from about 65 mol. % to about 70 mol. % SiO$_2$; from about 9 mol. % to about 14 mol. % Al$_2$O$_3$; from about 0 mol. % to about 11 mol. % B$_2$O$_3$; from about 5 mol. % to less than 10 mol. % alkali oxide R$_2$O, wherein R is at least one of Li, Na, and K; and from about 3 mol. % to about 11 mol. % of divalent oxide MO, wherein M is at least one of Mg, Ca, Ba and Zn. In this embodiment, the glass cladding layers may be ion-exchanged to further strengthen the glass article.

It should be understood that other glass compositions may also be used to form the glass cladding layers 104a, 104b of the laminated glass article 100, so long as the average coefficients of thermal expansion of the glass cladding layers 104a, 104b are less than the average coefficient of thermal expansion of the glass core layer 102.

EXAMPLES

Embodiments of the glass compositions described herein will be further clarified by the following examples.

A plurality of exemplary glass compositions were prepared according to the batch compositions listed in Tables 1-4 below. In each of these embodiments, F— was introduced into the glass batch as Na$_2$SiF$_6$. Batches of the oxide constituent components were mixed, melted and formed into glass plates. The opal state of the glasses upon formation and/or after an annealing treatment at 700° C. are reported in Tables 1-4. For Examples 19-24, properties of the glass melt (i.e., liquidus temperature, annealing point, etc.) were measured and the results are reported in Table 3. For Examples 20, 23 and 24, high temperature viscosity data was collected and the high temperature viscosity parameters A, B and T$_0$ were determined for the Fulcher equation:

$$\text{Log } \eta = A + B/(T-T_0)$$

where η is the shear viscosity, T is the temperature in Celsius, and A, B and T$_0$ are constants for each particular composition.

Referring to Table 1, Examples C1-C6 did not form opal glass on the draw or after a post-draw heat treatment. Accordingly, Examples C1-C6 are offered for purposes of comparison. Comparative Examples C1, C2 and C5 were utilized to assess the effect of substitutions of Al$_2$O$_3$ for SiO$_2$. Examples C3 and C4 were utilized to assess the effect of substitutions of fluorine for Na$_2$O in the glass compositions. Inventive Examples 7-9 were utilized to assess the effect of substituting Al$_2$O$_3$ for SiO$_2$ and fluorine for Na$_2$O. These glass compositions at least partially opalized on the draw.

TABLE 1

Exemplary Glass Compositions

| Batched (mol %) | C1 | C2 | C3 | C4 | C5 | C6 | 7 | 8 | 9 |
|---|---|---|---|---|---|---|---|---|---|
| SiO$_2$ | 64 | 62 | 64 | 64 | 60 | 62 | 60 | 62 | 60 |
| Al$_2$O$_3$ | 9 | 11 | 9 | 9 | 13 | 11 | 13 | 11 | 11 |
| Na$_2$O | 15 | 15 | 13 | 11 | 15 | 13 | 13 | 11 | 13 |
| ZnO | 3.5 | 3.5 | 3.5 | 3.5 | 3.5 | 3.5 | 3.5 | 3.5 | 5.5 |
| F$^-$ | 8.5 | 8.5 | 10.5 | 12.5 | 8.5 | 10.5 | 10.5 | 12.5 | 10.5 |
| SnO$_2$ | 0.12 | 0.12 | 0.12 | 0.12 | 0.12 | 0.12 | 0.12 | 0.12 | 0.12 |
| Total | 100.12 | 100.12 | 100.12 | 100.12 | 100.12 | 100.12 | 100.12 | 100.12 | 100.12 |
| Observation | glass | glass | glass | glass | glass | glass | partly opal | opal | partly opal |

Referring to Table 2, Inventive Examples 10-16 were based on the glass compositions of Inventive Examples 8 and 9. Examples C17 and C18 did not opalize and are offered for purposes of comparison. Inventive Examples 10 and 11 were utilized to assess the effect of substituting CaO and MgO for ZnO. Each of these glasses at least partially opalized. Inventive Example 12 indicates that substituting B$_2$O$_3$ for fluorine yielded good opal glass. Inventive Examples 13 and 14 indicated that substituting K$_2$O for Na$_2$O also yielded good opal glass. Inventive Examples 15 and 16 were used to assess the effect of substituting Al$_2$O$_3$ for SiO$_2$ (Example 15) and fluorine for Na$_2$O (Example 16). Both examples yielded good opal glass. The observations regarding opalization were made following an annealing treatment at 700° C.

TABLE 2

Exemplary Glass Compositions

| Batched (mol %) | 10 | 11 | 12 | 13 | 14 | 15 | 16 | C17 | C18 |
|---|---|---|---|---|---|---|---|---|---|
| SiO$_2$ | 62 | 62 | 62 | 62 | 62 | 58 | 60 | 58 | 60 |
| Al$_2$O$_3$ | 11 | 11 | 11 | 11 | 11 | 13 | 11 | 15 | 13 |
| Na$_2$O | 11 | 11 | 11 | 9 | 7 | 13 | 9 | 13 | 11 |
| ZnO | | | 3.5 | 3.5 | 3.5 | 5.5 | 5.5 | 3.5 | 3.5 |

TABLE 2-continued

Exemplary Glass Compositions

| Batched (mol %) | 10 | 11 | 12 | 13 | 14 | 15 | 16 | C17 | C18 |
|---|---|---|---|---|---|---|---|---|---|
| $F^-$ | 12.5 | 12.5 | 10.5 | 12.5 | 12.5 | 10.5 | 14.5 | 10.5 | 12.5 |
| CaO | 3.5 | | | | | | | | |
| MgO | | 3.5 | | | | | | | |
| $B_2O_3$ | | | 2 | | | | | | |
| $K_2O$ | | | | 2 | 4 | | | | |
| $SnO_2$ | 0.12 | 0.12 | 0.12 | 0.12 | 0.12 | 0.12 | 0.12 | 0.12 | 0.12 |
| Total | 100.12 | 100.12 | 100.12 | 100.12 | 100.12 | 100.12 | 100.12 | 100.12 | 100.12 |
| Observation | opal | partly opal | opal | opal | opal | opal | partly opal | glass | glass |

Referring to Table 3, Examples 19-24 were scaled up versions of Inventive Example 8 (Comparative Example 19), Inventive Example 10 (Inventive Example 20), Inventive Example 12 (Comparative Example 21), Inventive Example 14 (Comparative Example 22), Inventive Example 15 (Inventive Example 23) and a combination of Inventive Examples 10 and 14 (Inventive Example 24). Inventive Examples 20, 23, and 24 yielded good opal glasses while Comparative Examples 19, 21 and 22 only produced partial opal glass. The lack of opal formation in these glasses is believed to be due to the loss of fluorine to evaporization during re-melting of the composition. Accordingly, while these compositions were appropriately batched to produce opal glasses (as indicated by Inventive Examples 8, 10, 12, 14 and 15), the loss of fluorine during processing mitigated the phase separation necessary for opalization to occur. The observations regarding opalization were made following an annealing treatment at 700° C.

TABLE 3

Exemplary Glass Compositions

| Batched (mol %) | C19 | 20 | C21 | C22 | 23 | 24 |
|---|---|---|---|---|---|---|
| $SiO_2$ | 62 | 62 | 62 | 62 | 58 | 62 |
| $Al_2O_3$ | 11 | 11 | 11 | 11 | 13 | 11 |
| $Na_2O$ | 11 | 11 | 11 | 7 | 13 | 7 |
| ZnO | 3.5 | | 3.5 | 3.5 | 5.5 | |
| $F^-$ | 12.5 | 12.5 | 10.5 | 12.5 | 10.5 | 12.5 |
| CaO | | 3.5 | | | | 3.5 |
| $B_2O_3$ | | | 2 | | | |
| $K_2O$ | | | | 4 | | 4 |
| $SnO_2$ | 0.12 | 0.12 | 0.12 | 0.12 | 0.12 | 0.12 |
| Total | 100.12 | 100.12 | 100.12 | 100.12 | 100.12 | 100.12 |
| Observation | mainly glass | opal | mainly glass | mainly glass | partly opal | opal |
| Density (g/cm³) | | 2.416 | | | 2.529 | 2.415 |
| CTE (×10⁻⁷/C.) | | 80.1 | | | 79.5 | 85.8 |
| Anneal Pt (° C.) | | 629.2 | | | 558.2 | 630.3 |
| Strain Pt (° C.) | | 568.4 | | | 508.6 | 564.9 |
| Softening Pt (° C.) | | 902.8 | | | 854.5 | 929.6 |
| A | | −3.017 | | | −3.606 | −2.482 |
| B | | 9479.3 | | | 9864.5 | 8304.7 |
| To | | −127.7 | | | −90.9 | −30.2 |
| Poisson's Ratio | | 0.221 | | | 0.23 | 0.2 |
| Shear Modulus (Mpsi) | | 4.147 | | | 4.061 | 4.135 |
| Young's Modulus (Mpsi) | | 10.127 | | | 9.993 | 9.927 |

Referring to Table 4, Examples 25-33 were used to assess the effect of different colorants added to the glass batch. As demonstrated by Examples 25-30, the addition of $Fe_2O_3$, $Cr_2O_3$, $Co_3O_4$, CuO, Au, and $V_2O_5$ yielded colored opal glasses. The observations regarding opalization were made following an annealing treatment at 700° C.

TABLE 4

Exemplary Glass Compositions

| Batched (mol %) | 25 | 26 | 27 | 28 | 29 | 30 | 31 | 32 | 33 |
|---|---|---|---|---|---|---|---|---|---|
| $SiO_2$ | 60 | 61.75 | 61.9 | 61 | 61.99 | 60 | 61 | 61 | 61 |
| $Al_2O_3$ | 11 | 11 | 11 | 11 | 11 | 11 | 11 | 11 | 11 |

TABLE 4-continued

Exemplary Glass Compositions

| Batched (mol %) | 25 | 26 | 27 | 28 | 29 | 30 | 31 | 32 | 33 |
|---|---|---|---|---|---|---|---|---|---|
| $Na_2O$ | 7 | 7 | 7 | 7 | 7 | 7 | 7 | 7 | 7 |
| ZnO | 3.5 | 3.5 | 3.5 | 3.5 | 3.5 | 3.5 | 3.5 | 3.5 | 3.5 |
| $F^-$ | 12.5 | 12.5 | 12.5 | 12.5 | 12.5 | 12.5 | 12.5 | 12.5 | 12.5 |
| $K_2O$ | 4 | 4 | 4 | 4 | 4 | 4 | 4 | 4 | 4 |
| $Fe_2O_3$ | 2 | | | | | | | | |
| $Cr_2O_3$ | | 0.25 | | | | | | | |
| $Co_3O_4$ | | | 0.1 | | | | | | |
| CuO | | | | 1 | | | | | |
| Au | | | | | 0.01 | | | | |
| $V_2O_5$ | | | | | | 2 | | | |
| $Er_2O_3$ | | | | | | | 1 | | |
| $Nd_2O_3$ | | | | | | | | 1 | |
| $MnO_2$ | | | | | | | | | 1 |
| $SnO_2$ | 0.12 | 0.12 | 0.12 | 0.12 | 0.12 | 0.12 | 0.12 | 0.12 | 0.12 |
| Total | 100.12 | 100.12 | 100.12 | 100.12 | 100.12 | 100.12 | 100.12 | 100.12 | 100.12 |
| Observation | black opal | gray opal | blue opal | gray opal | purple opal | black opal | Glass | glass | glass |

It should now be understood that the opal glass compositions described herein have relatively high average coefficients of thermal expansion. As such, the glass compositions described herein are particularly well suited for use in conjunction with glass compositions with relatively low average coefficients of thermal expansion to form a compressively stressed laminated glass article by the fusion laminate process. The opaque nature of these glass articles make them suitable for use in tableware, countertops, appliance covers, and back panels of handheld electronic devices.

It should also be understood that the properties of the glass compositions described herein, (e.g., the liquidus viscosity, the liquidus temperature, and the like) make the glass compositions well suited for use with fusion forming processes, such as the fusion down draw process or the fusion lamination process.

While specific reference has been made herein to the use of the glass compositions as glass core layers of laminated glass articles, it should be understood that the glass compositions may also be used to independently form glass articles (i.e., non-laminated glass articles) such as, for example, back panels for electronic devices and the like.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass composition comprising:
   from about 55 mol. % to about 70 mol. % $SiO_2$;
   from 9 mol. % to about 15 mol. % $Al_2O_3$;
   from about 10 mol. % to about 15 mol. % alkali oxide $M_2O$, wherein M is at least one of Na or K;
   from about 2 mol. % to about 5.5 mol. % divalent oxide RO, wherein R is at least one of Zn, Ca, or Mg;
   from about 12.5 mol. % to about 16 mol. % $F^-$;
   from 0 mol. % to about 0.5 mol. % $SnO_2$; and
   from 0 mol. % to about 6 mol. % of colorant;
   wherein the glass composition is free from As and compounds containing As and is opalized as a result of phase separation during formation or with a post-formation heat treatment.

2. The glass composition of claim 1, wherein the glass composition comprises:
   from about 58 mol. % to about 64 mol. % $SiO_2$;
   from about 10 mol. % to about 12 mol. % $Al_2O_3$; and
   from about 11 mol. % to about 13 mol. % $M_2O$.

3. The glass composition of claim 1, wherein a concentration of the colorant is less than or equal to 2 mol. %.

4. The glass composition of claim 1, wherein the colorant is selected from the group consisting of $Fe_2O_3$, $Cr_2O_3$, $Co_3O_4$, CuO, Au, and $V_2O_5$.

5. The glass composition of claim 1, wherein the glass composition comprises from about 10 mol. % to about 15 mol. % $Na_2O$.

6. The glass composition of claim 1, further comprising $B_2O_3$.

7. The glass composition of claim 1, further comprising from about 2 mol. % to about 5 mol. % $B_2O_3$.

8. The glass composition of claim 1, wherein the glass composition comprises from about 2 mol. % to about 5.5 mol. % ZnO.

9. The glass composition of claim 1, further comprising from about 0.1 mol. % to about 0.3 mol. % $SnO_2$.

10. The glass composition of claim 1, further comprising an average coefficient of thermal expansion of greater than or equal to $75 \times 10^{-7}/°$ C. averaged over a temperature range from 20° C. to 300° C.

11. A glass article comprising:
   a glass core layer disposed between a first glass cladding layer and a second glass cladding layer, wherein the glass core layer is formed from the glass composition of claim 1.

12. The glass article of claim 11, wherein:
   the glass core layer has an average core coefficient of thermal expansion $CTE_{core}$; and
   the first glass cladding layer and the second glass cladding layer have an average cladding coefficient of thermal expansion $CTE_{clad}$ which is less than the average core coefficient of thermal expansion $CTE_{core}$.

13. The glass article of claim 12, wherein the average core coefficient of thermal expansion $CTE_{core}$ is greater than or equal to $75 \times 10^{-7}/°$ C. averaged over a temperature range from 20° C. to 300° C.

14. The glass article of claim 11, wherein the first glass cladding layer and the second glass cladding layer are formed from ion-exchangeable glass.

15. The glass article of claim 11, wherein the first glass cladding layer and the second glass cladding layer are compressively stressed.

16. The glass article of claim 11, wherein a first surface of the glass core layer is directly adjacent the first glass cladding layer, and wherein a second surface of the glass core layer is directly adjacent the second glass cladding layer.

17. The glass article of claim 11, wherein a diffusive layer is disposed between at least one of the first glass cladding layer or the second glass cladding layer and the glass core layer, and the average coefficient of thermal expansion of the diffusive layer has a value between that of an average core coefficient of thermal expansion of the glass core layer and an average cladding coefficient of thermal expansion of the at least one of the first glass cladding layer or the second glass cladding layer.

18. The glass article of claim 11, wherein the colorant is selected from the group consisting of $Fe_2O_3$, $Cr_2O_3$, $Co_3O_4$, CuO, Au, and $V_2O_5$.

19. The glass article of claim 11, wherein the glass core layer comprises:
   from about 58 mol. % to about 64 mol. % $SiO_2$;
   from about 10 mol. % to about 12 mol. % $Al_2O_3$; and
   from about 11 mol. % to about 13 mol. % $M_2O$.

20. The glass article of claim 11, wherein the glass composition comprises from about 2 mol. % to about 5.5 mol. % ZnO.

* * * * *